(12) United States Patent
Bachmann et al.

(10) Patent No.: US 10,375,802 B2
(45) Date of Patent: Aug. 6, 2019

(54) BUILDING EQUIPMENT-BASED COMMUNICATION SYSTEM

(71) Applicant: TRIDONIC GMBH & CO KG, Dornbirn (AT)

(72) Inventors: Johannes Bachmann, Götzis (AT); Frank Lochmann, Esseratsweiler (DE); Patrick Marte, Götzis (AT); Florian Moosmann, Muntlix (AT); Daniel Oblak, Dornbirn (AT); Rainer Troppacher, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 98 days.

(21) Appl. No.: 15/525,974

(22) PCT Filed: Dec. 16, 2015

(86) PCT No.: PCT/AT2015/050319
§ 371 (c)(1),
(2) Date: May 11, 2017

(87) PCT Pub. No.: WO2016/094921
PCT Pub. Date: Jun. 23, 2016

(65) Prior Publication Data
US 2017/0325322 A1 Nov. 9, 2017

(30) Foreign Application Priority Data

Dec. 19, 2014 (DE) .................... 20 2014 106 166 U
May 26, 2015 (AT) .......................... GM132-2015 U

(51) Int. Cl.
*H05B 37/02* (2006.01)
*H04L 12/403* (2006.01)
*H04L 12/24* (2006.01)

(52) U.S. Cl.
CPC ....... *H05B 37/0272* (2013.01); *H04L 12/403* (2013.01); *H04L 41/0853* (2013.01)

(58) Field of Classification Search
CPC .............. H05B 37/0272; H04L 12/403; H04L 41/0853
(Continued)

(56) References Cited

U.S. PATENT DOCUMENTS 5,790,536 A * 8/1998 Mahany .............. B60R 16/0231
370/338
2005/0097162 A1 * 5/2005 Budike, Jr. ............. H04L 29/06
709/201
(Continued)

FOREIGN PATENT DOCUMENTS

| WO | 2004023849 | 3/2004 |
|----|-----------|--------|
| WO | 2008027615 | 3/2008 |
| WO | 2009088901 | 7/2009 |

OTHER PUBLICATIONS

International Search Report in parent PCT Application PCT/AT2015/050319 dated Dec. 5, 2016.
(Continued)

*Primary Examiner* — Douglas W Owens
*Assistant Examiner* — Amy X Yang
(74) *Attorney, Agent, or Firm* — Andrus Intellectual Property Law

(57) ABSTRACT

The invention relates to a building equipment-based communication system (1) comprising at least one building equipment-based device as a master unit (20), in particular a light fixture, to which at least one slave unit (13, 14), in particular a sensor and/or actuator, can be connected via a network, preferably in a wireless manner; the slave unit (13) is designed to communicate with the master unit (10) via the network connection either directly or indirectly by way of other slave units (14); and the master unit (10) is designed
(Continued)

to send, via a communication interface (18), information received from the at least one slave unit (13,14).

12 Claims, 1 Drawing Sheet

(58) Field of Classification Search
USPC .......................................................... 315/321
See application file for complete search history.

(56) References Cited

U.S. PATENT DOCUMENTS

| | | | |
|---|---|---|---|
| 2006/0044152 A1* | 3/2006 | Wang | H04L 12/2803 340/2.24 |
| 2012/0078547 A1* | 3/2012 | Murdoch | G01D 4/004 702/62 |
| 2012/0235579 A1* | 9/2012 | Chemel | F21S 2/005 315/152 |
| 2014/0001963 A1* | 1/2014 | Chobot | H05B 37/002 315/153 |
| 2014/0273892 A1* | 9/2014 | Nourbakhsh | H04B 1/3827 455/90.3 |

OTHER PUBLICATIONS

German Search Report in co-pending German Patent Application 20 2014 106 166.5 dated Jul. 22, 2015.
Austria Search Report in co-pending Austria Patent Application GM 132/2015 dated Mar. 14, 2017.

\* cited by examiner

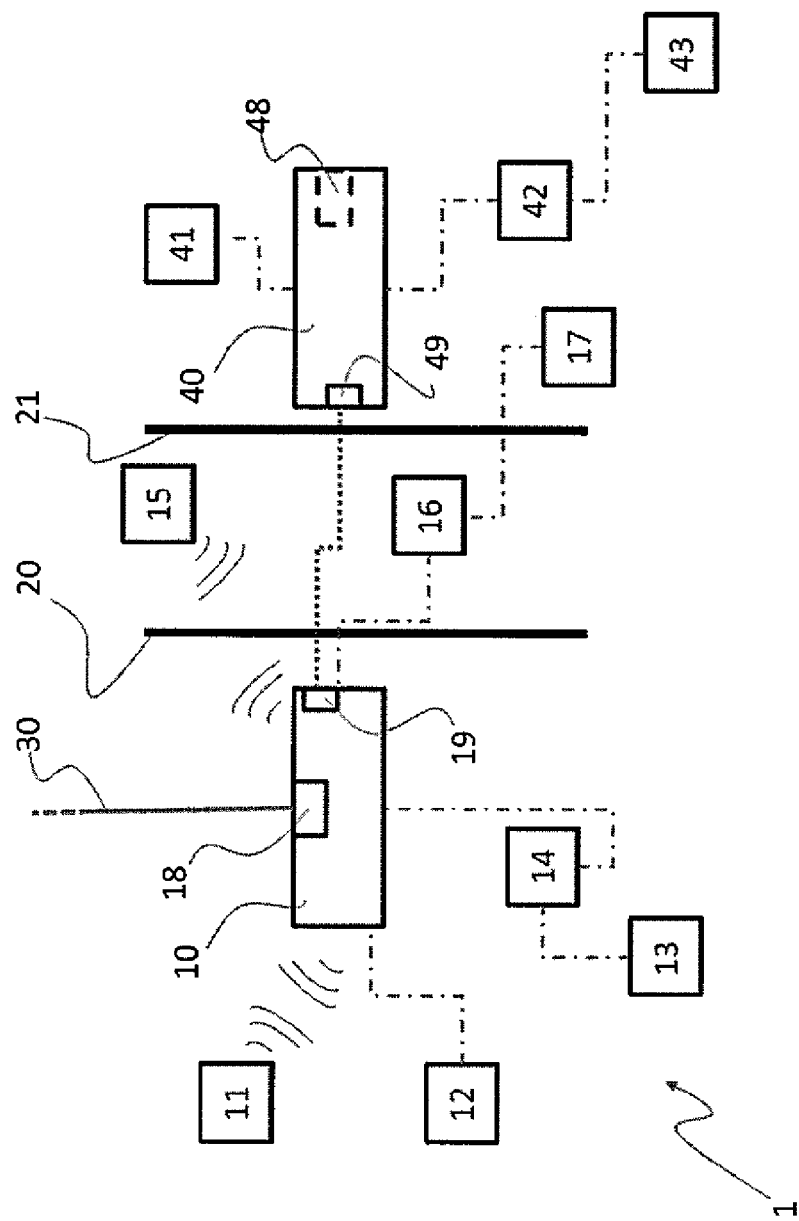

BUILDING EQUIPMENT-BASED COMMUNICATION SYSTEM

CROSS REFERENCE TO RELATED APPLICATION

The present application is the U.S. national stage application of International Application PCT/AT2015/050319, filed Dec. 16, 2015, which international application was published on Jun. 23, 2016 as International Publication WO 2016/094921 A1. The International Application claims priority to German Patent Application 20 2014 106 166.5, filed Dec. 19, 2014 and Austria Patent Application GM 132-2015 filed May 26, 2015.

FIELD OF THE INVENTION

The invention relates to a building equipment-based communication system, and in particular to a communication system formed by building equipment-based devices, such as light fixtures.

The invention also relates to a control device for an actuator, e.g. an operating unit for lamps, or a sensor in the field of the building equipment, configured for wireless addressed communication. The control device can have an interface for wireless communication with a second control device, and a control circuit for forwarding data received from the second control device to a third control device, having an address in the data.

BACKGROUND OF THE INVENTION

The invention relates substantially to a building equipment-based communication system having at least one building equipment-based device, wherein at least one sensor and/or actuator or other building equipment-based device can be connected to the building equipment-based device, preferably in a wireless manner.

The device connected to the building equipment-based device (sensor, actuator and/or building equipment-based device) can also be connected for communication to the building equipment-based device by means of other sensors/actuators. The building equipment-based device, which can be configured in particular as a light fixture having an operating unit for operating at least one lamp, in particular at least one LED, functions as a "master unit," i.e. as a main communication unit, to which "slave units," e.g. sensors and actuators, i.e. subordinate communication units, are connected.

The building equipment-based device provides a communication channel, e.g. to other building equipment-based devices, or a network, e.g. the Internet, and/or to a user, and/or allows communication of the slave units among themselves, with other building equipment-based devices, and/or a central processing unit, by way of example. The central processing unit can be connected to building equipment-based devices that are configured as master devices via a communication bus, e.g. a building equipment-based bus, which can be based on the DALI standard.

SUMMARY OF THE INVENTION

The invention is based on the idea that intelligent units, e.g. sensors and/or actuators, are increasingly used in modern buildings, in order to provide functions in the manner of an "intelligent building," e.g. sensory monitoring, and corresponding functions triggered by actuators. There are normally general building equipment-based devices in a building as well, e.g. light fixtures, as well as light switches, electrical outlets, heating system thermostats, television cable outlets, etc. These can be used as an already existing infrastructure, in order to incorporate additional sensors and/or actuators in a building equipment-based communication system.

To make this possible, the invention provides a control device and a building equipment-based communication system.

In a first aspect, the invention provides a control device for an actuator, e.g. an operating unit for lamps, or sensors in the field of the building equipment, which is configured for wireless addressed communication, and has an interface for wireless communication with a second control device, and a control circuit for forwarding data received from the second control device to a third control device, having an address in the data.

The control circuit can be connected to a memory in which the other control devices that can be reached by means of the wireless communication, and their associated addresses, are stored.

The invention provides a building equipment-based communication system, having at least one building equipment-based device as a master unit, in particular a light fixture, to which at least one slave unit can be connected, in particular a sensor and/or actuator, preferably in a wireless manner, via a network, wherein the slave unit is configured to communicate with the master unit via a network connection, directly or indirectly by means of other slave units, and wherein the master unit is configured to transmit data received from the at least one slave unit via a communication interface.

The master unit can transmit data received via the communication interface to slave units connected thereto. The communication interface can be a wireless or wired communication interface. In particular, the communication interface is a network interface.

The master unit can provide communication connections between slave units connected thereto.

The master unit can store data regarding communication connections to each of the slave units connected to it.

The master unit can establish a communication connection to another master unit, and/or to a central processing unit, directly or indirectly, in particular ad hoc. The central processing unit can be a central processing unit for building equipment-based systems, in particular for a lighting system.

The at least one slave unit can establish, in particular ad hoc, a communication connection, preferably a radio connection, with the master unit and/or at least one other slave unit.

The at least one slave unit can be dedicated to the master unit, and communicate with the master unit in a wireless manner.

The at least one slave unit can establish a connection to another slave unit, particularly when it cannot establish a connection to a master unit.

Each slave unit and each master unit can store data regarding which unit received a message, and data regarding which unit transmitted the message.

Each slave unit that receives a configuration message from another slave unit can forward this message, in particular to another slave unit, and can store information regarding which slave unit has received the message and/or to which unit the message is to be forwarded.

The master unit can store a slave unit for each dedicated slave unit, via which the dedicated slave unit can be reached.

The at least one slave unit can transmit a message regarding a detected event. The transmission can take place based on the stored data, regarding the unit to which a message has already been transmitted. Alternatively or additionally, each slave unit can store the communication partner with which a communication connection has been successfully established. If a message is to be transmitted, the unit can then use the stored communication partner to transmit the message.

The building equipment-based devices can be connected to one another in a wireless manner, or by wiring, in particular by a data bus.

The at least one slave unit can transmit or receive its configuration data and/or its acquired data regarding the detected event to and/or from the master unit.

The master unit can store and transmit configuration data and/or data regarding the detected event for a slave unit connected to it, and/or transmit configuration data and/or a query signal to a slave unit.

The slave unit can transmit a detection message to the master unit when it has acquired a detection event, i.e. data regarding a detected event. The master unit can transmit or forward the detection message and/or a message dedicated thereto by means of the communication interface.

At least one master unit can receive a configuration parameter, preferably transmitted by means of an input device, based on which configuration parameters for the master unit and/or its at least one dedicated slave unit can be set. The master unit can behave in different ways, depending on the configuration parameters upon receiving the detection message.

The master unit can be a building equipment-based device, preferably a light fixture, an electrical outlet, a thermostat, a network access device, in particular having an operating unit for operating a lamp, in particular an LED, or a control device, as described above. The at least one slave unit can be a sensor and/or an actuator, in particular a motion sensor, a smoke detector, a humidity sensor, a temperature sensor, a light sensor, an access monitoring sensor, a gate motor, a blind motor, or a heater.

The communication interface can be a wireless or wired interface, in particular for transmitting messages generated by means of IP protocols, in particular email, messenger services, WHATSAPP™, or SMS.

The master unit can be configured to selectively transmit data received from the slave unit, depending on the detection event, or depending on the type of slave unit, to different users or master units.

BRIEF DESCRIPTION OF THE DRAWINGS

The invention shall now be described with reference to the Figures. Therein:
FIG. 1 shows an exemplary embodiment of the invention.

DETAILED DESCRIPTION

The invention relates substantially to a wireless ad hoc communication network, which is formed by at least one building equipment-based device functioning as a master unit and at least one slave unit, e.g. a sensor or actuator.

In particular, the invention relates to a building equipment-based system, such as a lighting system, in which light fixtures are used as building equipment-based devices, having at least one operating unit for operating lamps. Light fixtures are normally present in many rooms of a building, and can thus function as communication nodes or hubs. The building equipment-based devices, or the lamps, respectively, thus function as main communication nodes or "master" units, to which subordinate communication units, e.g. sensors or actuators (hereinafter referred to as slave units) can be connected.

This connection preferably takes place in a wireless manner. The master units can then establish communication between the slave units connected thereto, as well as to other master units. Thus, it is also possible to connect the slave units to a central processing unit, in that the slave units are able to create a communication pathway via numerous master units to a central processing unit, for example.

The slave units can be connected to a master unit indirectly as well as directly. A direct connection is understood to be where it is possible for a slave unit to establish a preferably wireless connection to a master unit. This is the case in particular when the slave unit is located within the receiving/transmitting range of the master unit, depending on the radio technology (Bluetooth, ZigBee, NFC, IPv6, . . . ), such that a communication connection can be established.

If this is not the case, then it is possible according to the invention, for a slave unit (sensor/actuator) to establish a connection with another slave unit located in the receiving/transmitting range of the slave unit, thus being able to successively establish a communication connection to a master unit via numerous slave units.

A preferably wireless communication connection (Wi-Fi, ZigBee, Bluetooth, NFC, IPv6) is likewise provided for communication between different master units. There can also be a wired connection between the master units, as is the case, for example, in known building equipment-based bus systems (e.g. lighting system bus systems). In particular the master units can have a communication interface to an IP network and/or a communication network based on the GSM/LTE standard (e.g. for sending text messages and/or emails).

It is therefore not necessary to first define a network in a building. Instead, it is possible for he master units and/or the slave units to create an autonomous communication network ad hoc, e.g. after activation thereof. In this manner, every slave unit equipped for wireless communication can establish contact with a master unit.

It is further assumed that slave units and master units are stationary in the network that is to be established, such that it is not necessary to test and establish a data transfer channel that has already been created each time it is used.

Instead, both a simple direct transmission channel, as well as a multi-step transmission channel, or communication connection, can be stored in the participating units, and thus used for the next data transfer. By way of example, the master unit can store at least one communication partner for each slave unit it is connected to, via which the slave unit in question can then be reached.

It is also possible for the master unit to store a complete pathway to a slave unit. Likewise, in each slave unit through which another slave unit establishes a communication connection, the slave units that can be reached from that slave unit can be stored. In this manner, a communication can take place by transmitting messages to the respective subsequent communication partner, which then ensures that the message is forwarded to the recipient. This is also advantageous because a deactivation of the units need not result in a re-construction of the communication network being required.

It is understood thereby that both the slave units as well as the master units may be distributed over numerous rooms.

It is only decisive that the units can be accessed according to the selected communication standard.

Sensor data, on hand, are to be understood as an example of transferable data, which can be transferred from a slave unit to a master unit. On the other hand, configuration data can be transmitted from the master unit to slave units connected thereto. These can be, e.g., lag times, thresholds, etc. Thus, a specification of specific configuration parameters for different slave units can also already be specified in the master unit at the time of installation, wherein, if a certain slave unit (e.g. a daylight sensor) is to be connected at a later point in time to the master unit, then corresponding configuration instructions and parameters can be transmitted to the newly connected slave unit.

In order to connect individual units, it may be provided, for example, that after an activation of the master unit and/or a slave unit, i.e. after activating a power supply, for example, a mode is activated for a certain period of time, e.g. a predefined timespan, in which both the master unit and/or the slave unit are capable of establishing a communication connection with a new partner.

Such a mode can also be set by a corresponding user interface (button, switch, potentiometer, . . . ) on the slave unit and/or master unit. It is also possible that when, for example, the master units are at least partially connected via a wired connection, in particular to a central processing unit, a corresponding mode is also activated by an external command signal.

Additionally or alternatively, a configuration device can also be used, as a matter of course, which establishes a connection, in particular to the master unit, in order to thus transmit configuration parameters or communication parameters to the master unit, and to thus also configure the slave units connected thereto accordingly.

Consequently, a input/output device can be provided, with which a user can transmit instructions to the master unit, as well as output corresponding data regarding configuration or other data from the master unit.

The advantage with the present invention is thus that, in particular, the slave units can be used for data transfer via a mesh network, which can also be designed as an overlay network, e.g. DHT-based. Thus, the master units, which can be designed as light fixtures, as stated above, for example, can be used to signal data from the slave units connected thereto, e.g. via an appropriate activation of the lamp (blinking, switching on and off, color change, dimming, . . . ).

Alternatively or additionally, the building equipment-based operating unit, functioning as the master unit, can also transmit data via another communication channel, or communication interface, respectively, e.g. email, SMS, or other messaging services, e.g. a detection event of a sensor, or transmit a message associated therewith. It is possible to forward data, for example, regarding a movement detected by a motion sensor, or a certain smoke concentration detected via a smoke detector, via other communication channels by means of a communication interface, and to inform a user thereof, for example.

On the other hand, configuration data can also be transmitted via such a communication channel, or a user can instruct specific actuators to execute an action, for example. Thus, certain actuators could first be activated in response to a user interaction upon detecting movement in different regions of a building, in order to open or close doors, for example. It is also possible for the user to call up or initiate certain settings or sequences, e.g. a sequence of lighting configurations, by transmitting the appropriate data to the master unit.

Configurations that follow a specific activation/deactivation sequence from slave units, for example, e.g. if people are away on vacation, can be activated or deactivated by a user, or set as a result of a detected sensor signal.

By way of example, smoke detectors, fire sensors, motion sensors, daylight sensors, temperature sensors, humidity sensors, etc. can be provided as slave units. These can transmit a detection event to the master unit, designed for example as a light fixture, in a wireless manner. The master unit can then be connected to the Internet via the communication interface, in order to send a message, for example, to a user via a messaging service (WHATSAPP™, SKYPE™, . . . ) or by email.

It is also possible, however, for the slave unit itself to establish contact with a user. For this, the slave unit can then use the communication connection of the master unit and its communication interface. It may also be provided that the master unit switches to a specific operating mode, and/or causes other master units or slave units to switch to a specific operating mode, when it receives a detection signal from a slave unit, e.g. upon receiving a detection signal from a sensor. Thus, when the master unit is designed as a light fixture, a blinking mode can be set upon receiving a detection signal, or the color can be changed, and/or a dimming can take place.

It is furthermore possible to connect an emergency light operating unit to the master unit as a slave unit. As a result, it is possible for a user to call up, for example, data from the emergency light device, in particular, it is possible to query a charging state of the emergency light device battery.

By way of example, it may be possible for the detection signal to be forwarded to different master units or a user, depending on the type of slave unit and/or the type of detection event. By way of example, the detection signal may only be selectively forwarded to specific master units or different users. By way of example, a detection signal from a smoke detector or fire detector may be forwarded directly to other master units, as well as to a central fire alarm system. In this case, a blinking mode can be set upon receiving a detection signal in the master units, when they are designed as light fixtures, and thus a visible warning can be issued, and at the same time, a more extensive alarm can be issued via the data from the central fire alarm system functioning as the user. In comparison, a detection signal of a daylight sensor can only be forwarded to the surrounding master units designed as light fixtures, for example, and these can then cause a change in brightness, for example, through dimming. By way of example, light fixtures can also be automatically activated when a movement is detected by a motion sensor. This can take place, in particular, when the user has previously indicated that he has left the house, e.g. by sending the appropriate data to the master unit, or if the master unit has determined, e.g. by monitoring door sensors, that the house is vacant. The master unit can then likewise inform the user (e.g. by SMS, email, etc.). If in contrast, the user has already indicated his presence in the house, then a selective reaction can be initiated by the master unit, through changing the brightness by means of dimming, and the data is not forwarded to the user or other master units in other buildings.

On the whole, it is also possible to query data from a slave unit connected to a master unit in this manner, such as air humidity, temperature, etc.

It is also possible for the master unit to assume administrative functions for the slave units. By way of example, the master unit can call up data from another network, e.g. the Internet, in a time controlled manner or in response to an external command, in order to update configurations of the slave unit connected thereto, or the master unit itself (or master units connected thereto). In particular, the master unit can retrieve software update data from the Internet, and make it available to the slave units connected thereto.

In particular, the master unit can retrieve software update data from the Internet, and make it available to the slave units connected thereto.

In particular, the master unit can transmit the software update data to the corresponding slave units connected thereto, in order to update their operating software. This transmission can also take place the next time the slave unit is in contact with the master unit.

On the other hand, it is also possible for a user to transmit data to the master unit, thus controlling actuators, for example. The user can adjust, call up, or modify the lighting, temperature or a setting of the blinds, and on the whole, control, activate and/or deactivate devices by transmitting the data regarding the units, e.g. made available via a web browser, to the master unit, e.g. via the Internet and via a configuration interface.

One example of this is the activation of a blinking or flickering mode for a light fixture, in order to scare off intruders, for example. Various lighting scenarios can also be stored, which can be called up or configured in the master unit by a user. A presence simulation is one example. It is also possible to synchronize the indoor climate of different rooms by evaluating data from humidity sensors and/or temperature sensors, in order to obtain an appropriate climate setting. This evaluation can be carried out externally by the user, on one hand, and on the other hand, it can be provided that the master unit carries out an appropriate calculation of the parameters. In particular, it can be provided that the master unit issues warning signals.

Preferably, numerous sensors are provided in a room, or numerous rooms. The sensors are preferably connected to one another and/or to a master unit, in particular a master light fixture, in a wireless manner. As a matter of course, a master light fixture can also be connected to other slave light fixtures. The slave units connected thereto, in particular the sensors, transmit data to the master unit, e.g. when certain thresholds have been exceeded. The user can output data and modify configurations in the master units or slave units via an input/output device, e.g. via an application on a smartphone, i.e. set limit values or enter or modify communication settings that concern the forwarding of data. The master unit thus acquires central data regarding the sensors connected thereto, and makes it possible to output or forward this data.

E.g. a light fixture can issue a signal by blinking when a gas sensor/fire alarm issues a detection event. On one hand, the light fixture can then activate a predefined lighting scenario, e.g. a blinking, and on the other hand, inform the user by means of an SMS, email, messaging service, etc.

Light fixtures can also be activated automatically when a movement has been detected by a motion sensor. This can take place, in particular, when the user has previously indicated that he is leaving the house, e.g. by sending information in this regard to the master unit, or when the master unit has established that the house is vacant, e.g. by monitoring door sensors. The master unit can then likewise inform the user of this (e.g. by SMS, email, etc.).

Furthermore, the user can be informed when the air humidity has exceeded a specific threshold value, e.g. 80%. The master unit can transmit a predefined message (e.g. "window open," "air humidity too high") to the user. It is also possible, as a matter of course, for a sensor connected thereto to transmit such a message itself to the user, using the communication possibilities of the master unit, and in particular using the communication interface of the master unit, as already explained above.

In another example, a notification can be issued when a certain temperature has been exceeded.

The master units can use operating units for this, which are designed in particular as IC, ASIC or microcontrollers.

FIG. 1 shows schematically, a building equipment-based communication system 1 according to the invention.

First, a master unit 10 is shown, having dedicated slave units 11-16. A communication connection is established between the master unit 10 and the slave units 11 and 15, depicted by the symbolic radio waves. A communication connection of the master unit 10 to the slave units 12, 13, 14 and 16 and vice versa is already established, as is indicated by the dash-dotted lines. It is understood thereby that the communication connection does not always have to be active, but rather, can be activated as needed by the master unit 10 and/or the slave units 12, 13, 14, and 16. The slave unit 13 is connected to the master unit 10 via the slave unit 14.

The slave units 11-16 do not need, however, to be installed in the same room, for example, as the master unit. Room borders are indicated in FIG. 1 by the barriers 20 and 21. Thus, the slave unit 16 can be spatially separated from the master unit 10, for example. A slave unit 17, which is further spatially separated from the master unit 10 can however be connected thereto via another slave unit, slave unit 16.

The master unit 10 can also have a communication interface 18, which is configured to create a communication connection to outside the master unit 10. E.g., the communication interface 18 can establish a network connection 30, in particular an IP network connection. The master unit 10 can thus transmit or receive messages, data and information to and/or from a network via the communication interface 18.

Furthermore, another master unit 40 is shown in FIG. 1, which can likewise have a communication interface 48. The further master unit 40 can be connected to the master unit 10, by means of a wired connection or a wireless connection (dotted line). For this, the master unit 10 can have an interface 19. Likewise, the other master unit 40 can have a corresponding interface, in order to enable the connection to the master unit 10 and its interface 19. The other master unit 40 can also use the communication interface 18 via the connection to the master unit 10 in order to send and/or receive data, messages or information.

The slave units 41-43 can be dedicated to the other master unit 40, wherein the slave unit 43 is connected indirectly to the other master unit 40 via a slave unit 42. The other master unit 40 can however be designed substantially identical to the master unit 10.

In particular, a lighting system having light fixtures as master units 10, 40, can be realized with numerous sensors and/or safety devices as slave units 11-17; 41-43, and a wireless communication interface 18, which is configured to issue warning signals if a malfunction occurs and/or a safety risk arises, which has been determined by the sensors and/or safety devices. The warning signals are issued in particular via the communication interface 18, or by altering the light emission, for example, of the light fixture. The warning signals can thus take place through an activation of the light fixture and/or issuing a visual, acoustic, etc. signal from the slave units and/or an issuing of a message from the communication interface 18 of the light fixture to a user. The slave units and/or safety devices can forward warning signals to one another, preferably in a wireless manner. The light fixture can send commands to a central control device via the communication interface 18, in order to indicate the malfunction and/or safety risk. Limit values for malfunctions and/or safety risks can be set individually by a user.

The building equipment-based device 10 according to FIG. 1 can be a control device. This control device can activate an actuator, e.g. an operating unit for lamps, or a sensor (e.g. slave unit 11, 12), and it can be configured for wireless addressed communication. An interface, e.g. the interfaces 19, 49 can be provided for wireless communication with a second control device, e.g. the other master unit 40, and a control circuit (not shown) may be provided for forwarding data received from the second control device, e.g. the other master unit 40, to a third control device (not shown), the addresses of which are contained in the data.

The control circuit of, e.g., the master units 10, 40 can be connected to a memory, in which the other control devices that can be reached by means of the wireless communication, and their associated addresses, are stored.

What is claimed is:

1. A building equipment-based communication system having:
    at least one building equipment-based device comprising a light fixture with an operating device having a communication interface for an IP network connection serving as a master unit;
    multiple slave units, each comprising a sensor and/or actuator, that are connected to the master unit, through an ad hoc network, wherein each slave unit is configured to communicate, directly, or indirectly by means of other slave units, with the master unit via the ad hoc network and at least one slave unit is configured to communicate indirectly by means of the other slave units with the master unit via the ad hoc network; and
    wherein the master unit (10) is configured to transmit data received from at least one of the slave units to the IP network via said communication interface;
    wherein the master unit stores a complete pathway to each slave unit connected to the master unit through the ad hoc network; and
    further wherein a first slave unit is configured to establish an ad hoc, radio communication connection with the master unit and a second slave unit; where the first and second slave units and the master unit are configured to store information regarding the unit from which a message has been received and the unit to which the message has been sent; and each slave unit that has received the message from another slave unit is configured to forward this message, and to store information regarding the slave unit from which the message has been received and the slave unit to which the message has been forwarded.

2. The building equipment-based communication system according to claim 1, wherein: the master unit is configured to transmit data received via the communication interface to at least some of the slave units connected thereto; the master unit is configured to establish communication connections between the slave units connected thereto; the master unit (10) is configured to store data regarding communication connections to each slave unit connected to it; and the master unit is configured to establish a communication connection for communicating with another master unit indirectly or directly, with a central processing unit.

3. The building equipment-based communication system according to claim 2 wherein the master units are connected to one another by a data bus.

4. The building equipment-based communication system according to claim 1 wherein the master unit stores an address of a slave unit dedicated to another slave unit via which the dedicated slave unit can be reached and through which the at dedicated slave unit transmits a message regarding a detected event to the master unit.

5. The building equipment-based communication system according to claim 1 wherein at least one slave unit is configured to receive configuration data from the master unit; and the master unit is configured to transmit configuration data to the at least one slave unit upon receiving a query signal.

6. The building equipment-based communication system according to claim 1 wherein the at least one slave unit is configured to transmit a detection message to the master unit when a detection event has been detected by the at least one slave unit and wherein the master unit is configured to transmit/ the detection message, by means of the communication interface; and the master unit is configured to receive transmitted configuration parameters by means of an input device, based on which setting parameters for the master unit or the at least one slave unit can be set.

7. The building equipment-based communication system according to claim 1 wherein the master unit is a building equipment-based device, comprising a light fixture having an operating unit for operating an LED lamp, and the at least one slave unit comprises at least one of: a motion sensor, smoke detector, humidity sensor, temperature sensor, light sensor, access monitoring sensor, rolling gate motor, blind motor, and a heating system.

8. The building equipment-based communication system according to claim 1 wherein the communication interface transmits messages by means of IP protocols comprising at least one of email, messenger services, and SMS.

9. The building equipment-based communication system according to claim 1 wherein the master unit is configured to selectively transmit the data received from the slave units to different users or different master units, depending on a detection event and depending on the type of slave unit.

10. A building equipment-based communication system having:
    at least one building equipment-based device comprising an LED light fixture with an operating device having a communication interface for an IP network connection serving as a master unit;
    multiple slave units, each comprising a sensor and/or actuator, that are connected to the master unit, through an ad hoc network, wherein each slave unit is configured to communicate, directly, or indirectly by means of other slave units, with the master unit via the ad hoc network and at least one slave unit is configured to communicate indirectly by means of the other slave units with the master unit via the ad hoc network; and
    wherein the master unit (10) is configured to transmit data received from at least one of the slave units to the IP network via said communication interface;
    wherein the master unit stores a complete pathway to each slave unit connected to the master unit through the ad hoc network; and
    wherein at least one slave unit is a sensor and is configured to transmit a detection signal to the master unit when a detection event has been detected by the at least one slave unit and wherein the master unit is configured to change the operating mode of the LED light fixture upon receiving the detection signal, and said changed operating mode comprises at least one of a blinking mode, a color change or dimming upon receiving the detection signal.

11. The building equipment-based communication system according to claim 10 where the changed operating mode serves as a visual warning.

12. A building equipment-based communication system having:
- at least one building equipment-based device comprising an LED light fixture with an operating device having a communication interface for an IP network connection serving as a master unit;
- multiple slave units, each comprising a sensor and/or actuator, that are connected to the master unit, through an ad hoc network, wherein each slave unit is configured to communicate, directly, or indirectly by means of other slave units, with the master unit via the ad hoc network and at least one slave unit is configured to communicate indirectly by means of the other slave units with the master unit via the ad hoc network; and
- wherein the master unit (10) is configured to transmit data received from at least one of the slave units to the IP network via said communication interface;
- wherein the master unit stores a complete pathway to each slave unit connected to the master unit through the ad hoc network;
- wherein at least one slave unit is a sensor and is configured to transmit a detection signal to the master unit when a detection event has been detected by the at least one slave unit, and the master unit is configured to selectively transmit the data received from said at least one slave unit to different users or different master units, depending on a detection event and depending on the type of slave unit.

* * * * *